(12) United States Patent
Takahashi

(10) Patent No.: US 12,461,073 B2
(45) Date of Patent: Nov. 4, 2025

(54) DETECTION SYSTEM, CONTROL METHOD, AND DETECTION DEVICE

(71) Applicant: KABUSHIKI KAISHA TOSHIBA, Tokyo (JP)

(72) Inventor: Hiromasa Takahashi, Minato (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 353 days.

(21) Appl. No.: 18/162,814

(22) Filed: Feb. 1, 2023

(65) Prior Publication Data

US 2023/0168229 A1 Jun. 1, 2023

Related U.S. Application Data

(63) Continuation of application No. PCT/JP2021/028123, filed on Jul. 29, 2021.

(30) Foreign Application Priority Data

Aug. 7, 2020 (JP) .................................. 2020-135082

(51) Int. Cl.
*G01N 29/265* (2006.01)
*B23K 31/12* (2006.01)
(Continued)

(52) U.S. Cl.
CPC ......... *G01N 29/265* (2013.01); *B23K 31/125* (2013.01); *B25J 9/0096* (2013.01);
(Continued)

(58) Field of Classification Search
CPC .... G01N 29/265; G01N 29/043; G01N 29/11; G01N 29/28; G01N 28/4427;
(Continued)

(56) References Cited

U.S. PATENT DOCUMENTS 11,249,051 B2 2/2022 Ono et al.
2007/0144262 A1 6/2007 Aznar et al.
(Continued)

FOREIGN PATENT DOCUMENTS

CN 107440745 A 12/2017
CN 107708943 A 2/2018
(Continued)

OTHER PUBLICATIONS

International Search Report issued Oct. 19, 2021 in PCT/JP2021/028123 filed on Jul. 29, 2021 3 pages.
(Continued)

*Primary Examiner* — David Z Huang
(74) *Attorney, Agent, or Firm* — Oblon, McClelland, Maier & Neustadt, L.L.P.

(57) ABSTRACT

According to one embodiment, a detection system includes an arm mechanism and an end effector. The arm mechanism is articulated. The end effector is located at a distal part of the arm mechanism. The end effector includes a rotating stage and a detector. The detector is located at the distal part with the rotating stage interposed. The detector transmits an ultrasonic wave and detects a reflected wave. A tip of the detector is positioned at a rotation center of the rotating stage.

16 Claims, 15 Drawing Sheets

(51) Int. Cl.
  *B25J 9/00* (2006.01)
  *G01N 29/04* (2006.01)
  *G01N 29/11* (2006.01)
  *G01N 29/28* (2006.01)
  *G01N 29/44* (2006.01)
  *G01N 33/207* (2019.01)

(52) U.S. Cl.
  CPC ........... *G01N 29/043* (2013.01); *G01N 29/11* (2013.01); *G01N 29/28* (2013.01); *G01N 29/4427* (2013.01); *G01N 33/207* (2019.01); *G01N 2291/267* (2013.01)

(58) Field of Classification Search
  CPC .. G01N 33/207; G01N 29/262; G01N 29/225; B23K 31/125; B25J 9/0096; B25J 19/026
  See application file for complete search history.

(56) References Cited

U.S. PATENT DOCUMENTS

| | | | | |
|---|---|---|---|---|
| 2012/0243771 | A1* | 9/2012 | Matsumoto | G01N 29/0672 382/141 |
| 2015/0253288 | A1 | 9/2015 | Spencer et al. | |
| 2016/0123933 | A1* | 5/2016 | Fetzer | G01N 29/28 73/634 |
| 2019/0084824 | A1* | 3/2019 | Vannesson | B63B 27/00 |
| 2020/0003735 | A1 | 1/2020 | Ushijima et al. | |

FOREIGN PATENT DOCUMENTS

| | | |
|---|---|---|
| CN | 110402388 A | 11/2019 |
| CN | 111065918 A | 4/2020 |
| JP | 11-14610 A | 1/1999 |
| JP | 2006-153710 A | 6/2006 |
| JP | 2013-88242 A | 5/2013 |
| JP | 2016-118532 A | 6/2016 |
| JP | 2019-90727 A | 6/2019 |
| JP | 2020-93335 A | 6/2020 |
| WO | WO 2021/182024 A1 | 9/2021 |

OTHER PUBLICATIONS

Ushijima et al. "Spot Welding Inspection Robot Achieving Labor Saving and Improvement of Reliability Using 3D Ultrasonic Inspection Equipment" Toshiba Review, Special Reports, Jul. 2019, vol. 74, No. 4, 10 pages.

Matsumura et al. "Image Recognition Techniques Enabling Precise Understanding for Robots" Toshiba Review, Special Reports, Jul. 2019, vol. 74, No. 4, 11 pages.

Chinese Office Action dated Aug. 5, 2025, issued in Chinese Patent Application No. 202180057106.3 (with English translation).

\* cited by examiner

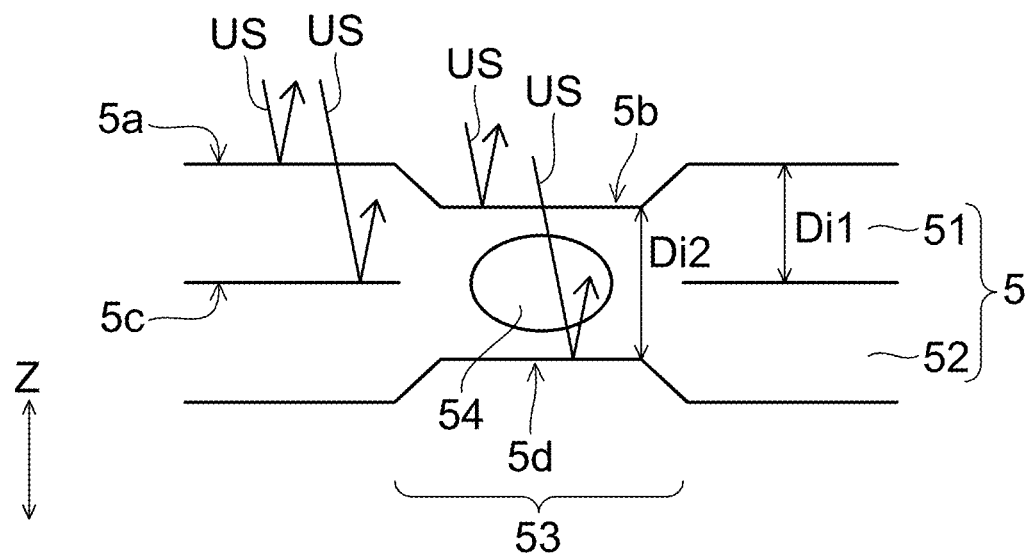
FIG. 12A
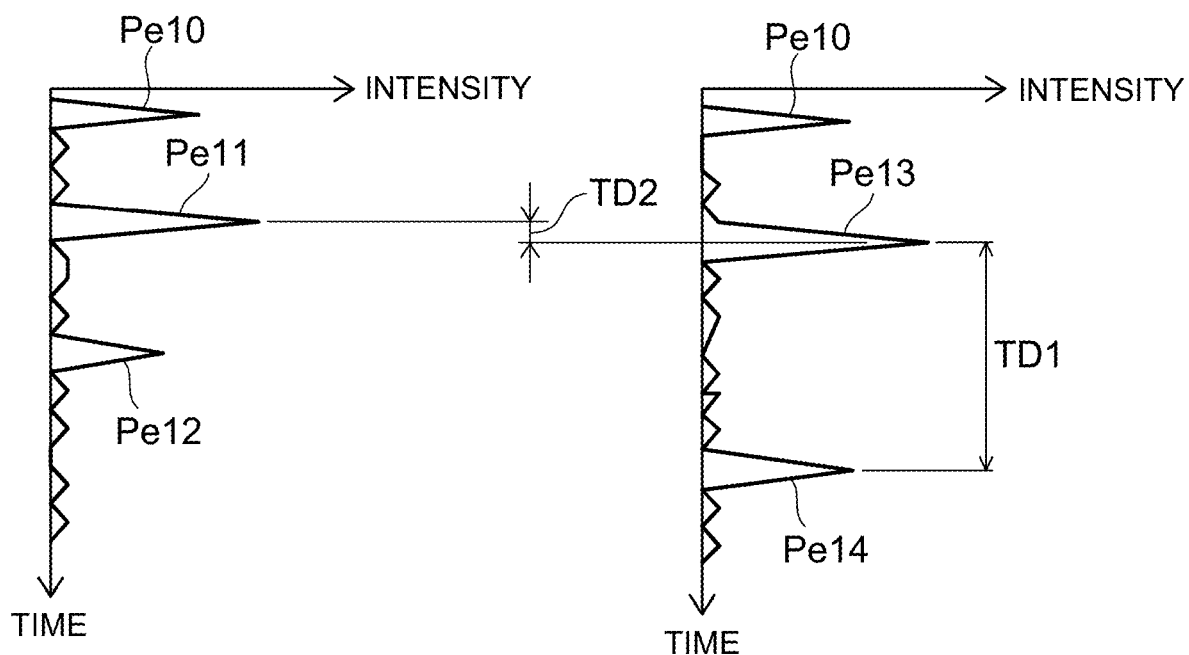
FIG. 12B
FIG. 12C

DETECTION SYSTEM, CONTROL METHOD, AND DETECTION DEVICE

CROSS-REFERENCE TO RELATED APPLICATIONS

This is a continuation application of International Patent Application PCT/JP2021/028123, filed on Jul. 29, 2021. This application also claims priority to Japanese Patent Application No. 2020-135082, filed on Aug. 7, 2020. The entire contents of which are incorporated herein by reference.

FIELD

Embodiments described herein relate generally to a detection system, a control method, and a detection device.

BACKGROUND

There are systems and devices to inspect any object. It is desirable to improve the ease of use of such systems and devices.

BRIEF DESCRIPTION OF THE DRAWINGS

FIGS. 12A to 12C are schematic views for describing an inspection method using the detector;

DETAILED DESCRIPTION

Figure 1:
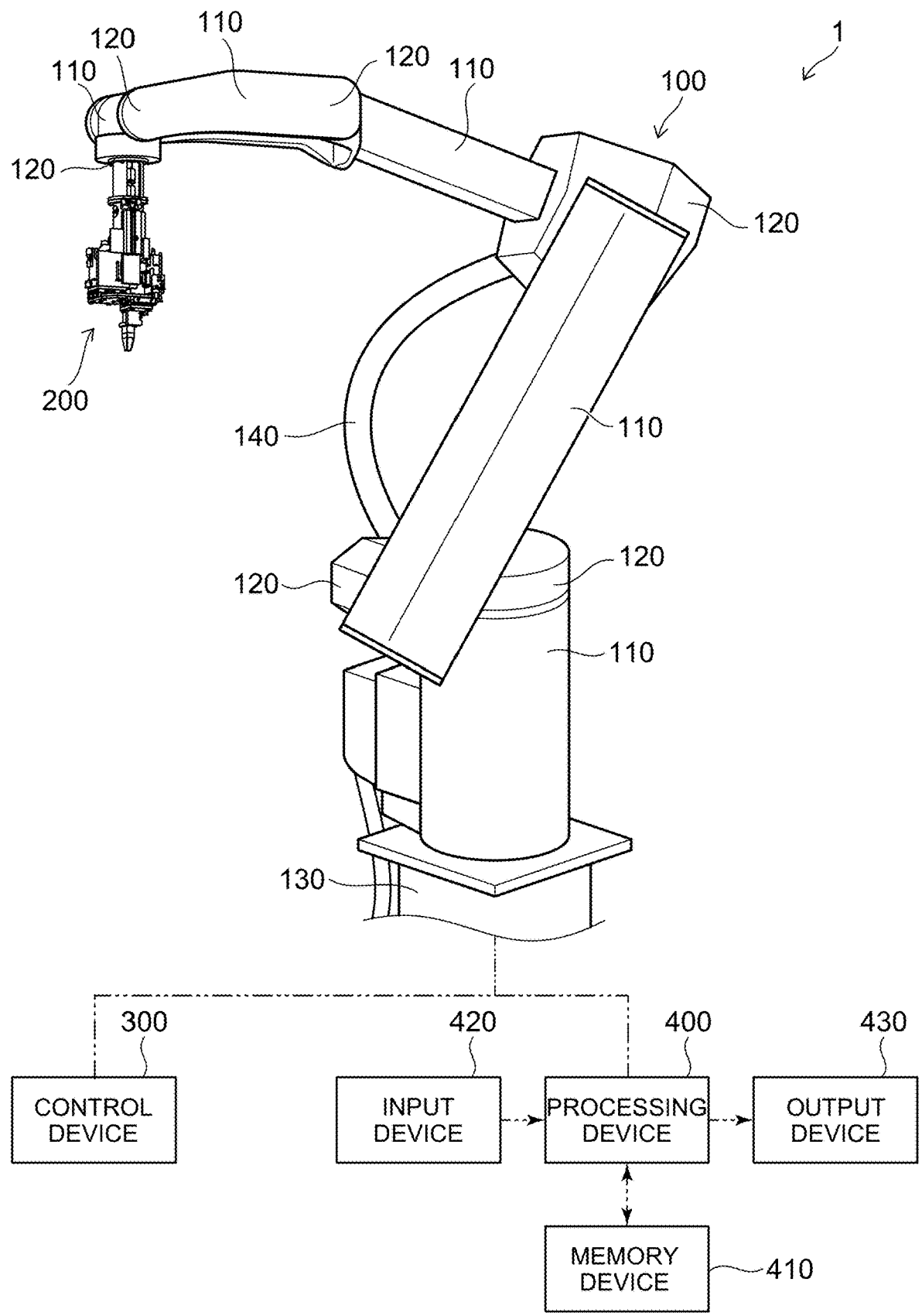
FIG. 1 is a perspective view illustrating a detection system according to an embodiment.

According to one embodiment, a detection system includes an arm mechanism and an end effector. The arm mechanism is articulated. The end effector is located at a distal part of the arm mechanism. The end effector includes a rotating stage and a detector. The detector is located at the distal part with the rotating stage interposed. The detector transmits an ultrasonic wave and detects a reflected wave. A tip of the detector is positioned at a rotation center of the rotating stage.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

FIG. 1 is a perspective view illustrating a detection system according to an embodiment.

As illustrated in FIG. 1, the detection system 1 according to the embodiment includes an arm mechanism 100, an end effector 200, a control device 300, a processing device 400, and a memory device 410.

The arm mechanism 100 includes multiple links 110 and multiple rotation axes 120. Ends of the links 110 are linked to each other by the rotation axis 120. One link 110 rotates with respect to another link 110 when the rotation axis 120 is driven by a motor.

It is favorable for the degrees of freedom of the arm mechanism 100 to be not less than four degrees of freedom. For example, the arm mechanism 100 is a vertical articulated robot and has six degrees of freedom. In other words, the positions in three directions of the distal part of the arm mechanism 100 and the angles around the three directions of the distal part can be controlled.

The end effector 200 is located at the distal part of the arm mechanism 100. In the detection system 1 illustrated in FIG. 1, the end effector 200 is configured to have six degrees of freedom.

Wiring and a pipe for supplying electrical power and a couplant to the end effector 200 are mounted to the arm mechanism 100. For example, the wiring and the pipe are bundled by a binding member 140. The binding member 140 includes, for example, a spiral tube, a clip, a clamp, a band, etc. Or, the wiring and the pipe may be passed through the interiors of the links 110.

The control device 300 transmits drive signals to the motors of the arm mechanism 100. The motors are driven according to the drive signals to control the rotation angles of the rotation axes 120. The posture of the distal part of the arm mechanism 100 is controlled thereby. For example, the control device 300 uses an inverse kinematics calculation to calculate the rotation angles of the rotation axes 120 so that the posture of the control point becomes the desired posture. A control point is a point of which the position and the orientation are controlled by the control device 300. For example, the control point is set to any one point at the distal part of the arm mechanism 100. Or, the control point may be set to any one point of the end effector 200.

The processing device 400 calculates the tilt of a detector 220 located at the end effector 200. The processing device 400 inspects any object based on the detection result of the detector 220. The memory device 410 stores the detection result, data obtained by the processing of the processing device 400, etc.

The control device 300 and the processing device 400 each include, for example, a central processing unit (CPU), read-only memory (ROM), random access memory (RAM), a memory device, an input interface, an output interface, a communication interface, and a bus that connects these devices. The memory device 410 includes, for example, at least one selected from a hard disk drive (HDD), a solid-state drive (SSD), and a network-attached hard disk (NAS).

An input device 420 and an output device 430 may be connected to the processing device 400. The input device 420 is used by the user to input data to the processing device 400. The input device 420 includes, for example, at least one selected from a keyboard, a mouse, a touchpad, and a microphone (audio input). The output device 430 outputs the data transmitted from the processing device 400 to the user. The output device 430 includes, for example, at least one selected from a monitor, a speaker, a printer, and a projector.

Figure 2:
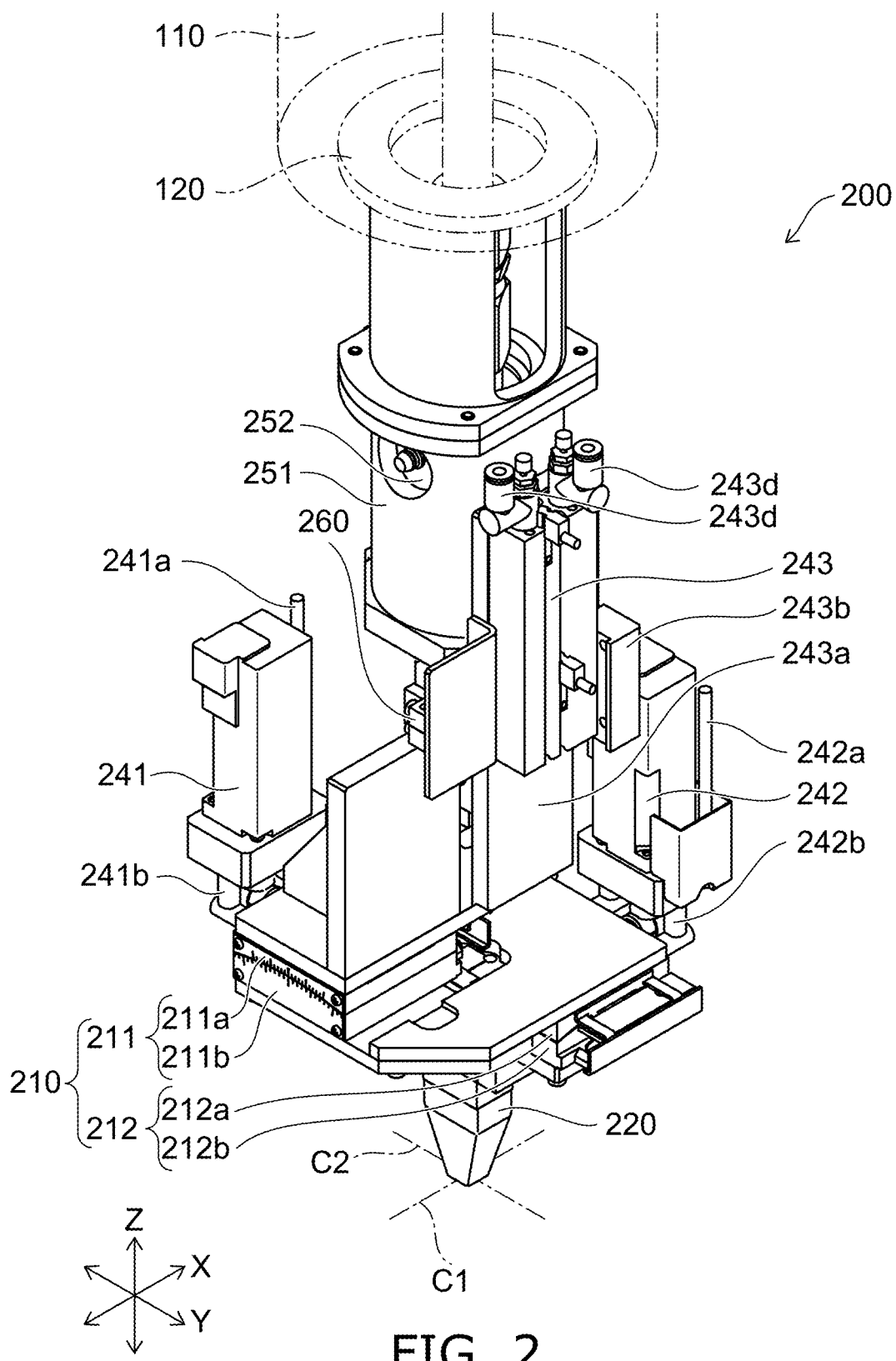
FIG. 2 is a perspective view illustrating an end effector according to the embodiment.
Figure 3:
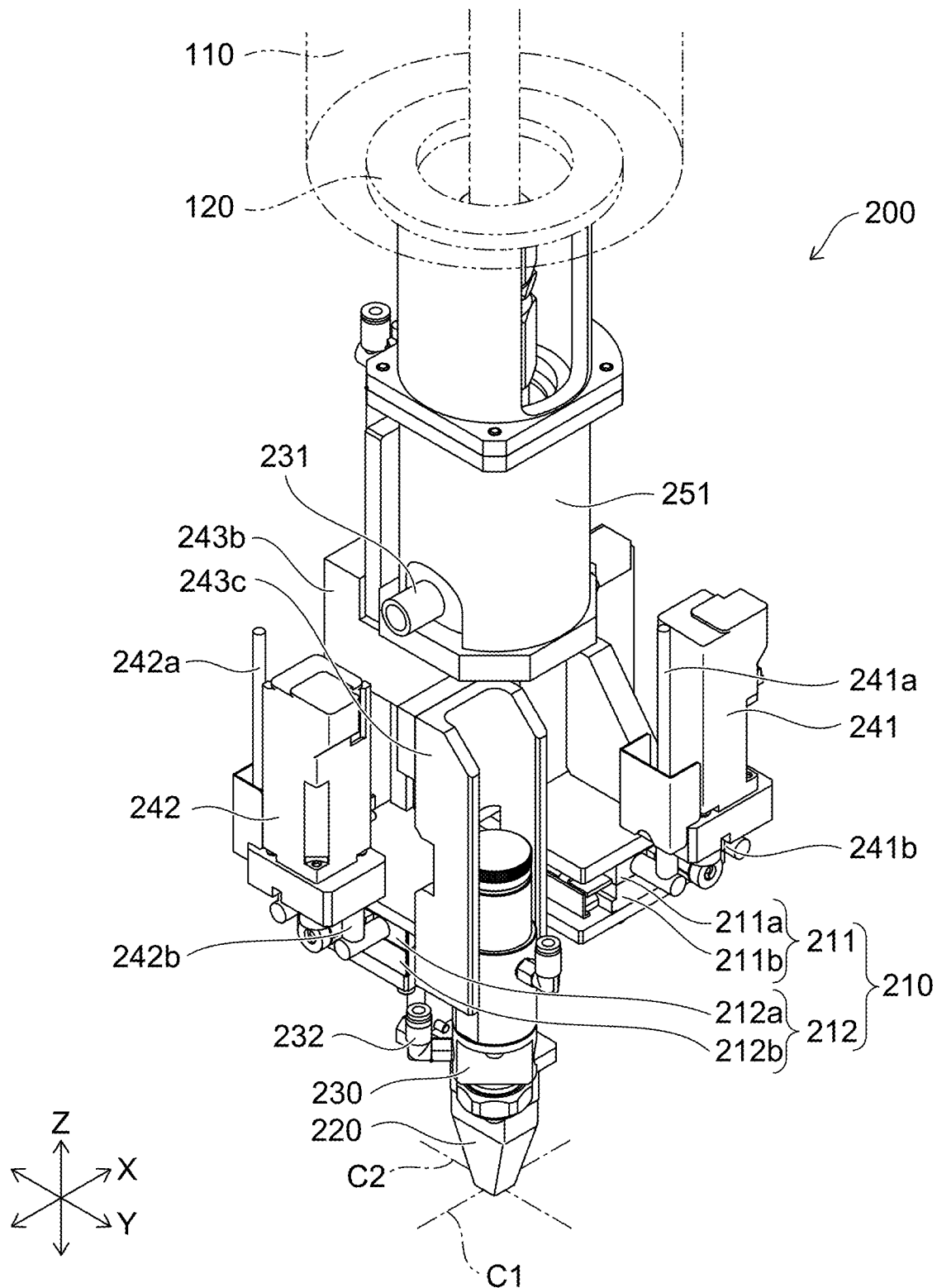
FIG. 3 is a perspective view illustrating the end effector according to the embodiment.

FIGS. 2 and 3 are perspective views illustrating the end effector according to the embodiment.

As illustrated in FIGS. 2 and 3, the end effector 200 includes a rotating stage 210, the detector 220, a dispenser 230, a first driver 241, a second driver 242, a third driver 243, an outer tube 251, a rotary joint 252, and a sensor 260.

The rotating stage 210 has two degrees of freedom with respect to the distal part of the arm mechanism 100. The detector 220 is mounted to the distal part of the arm mechanism 100 via the rotating stage 210. In other words, the detector 220 is configured to have two degrees of freedom with respect to the distal part of the arm mechanism 100. The tip of the detector 220 is positioned at the rotation center of the rotating stage 210. The posture of the detector 220 is determined by the posture of the distal part of the arm mechanism 100 and the state of the rotating stage 210.

Herein, the posture means the position and the orientation. The posture is determined by the positions in three mutually-orthogonal directions and the angles (rolling, pitching, and yawing) around each direction.

The detector 220 probes (performs probing) of the object of the inspection. The probe includes transmitting an ultrasonic wave and detecting a reflected wave. The transmitting direction of the ultrasonic wave changes according to the posture of the detector 220.

The rotating stage 210 includes a first stage 211 and a second stage 212. One of the first stage 211 or the second stage 212 is mounted to the other rotating stage. In the illustrated example, the second stage 212 is mounted to the rotating stage of the first stage 211.

The first stage 211 rotates around an X-direction (a first direction). The second stage 212 rotates around a Y-direction (a second direction). The X-direction and the Y-direction are orthogonal to each other. The X-direction and the Y-direction cross a Z-direction that is from the distal part of the arm mechanism 100 toward the end effector 200. For example, the Z-direction is perpendicular to the X-direction and the Y-direction in the state in which the first stage 211 and the second stage 212 are not tilted.

The transmitting direction (a third direction) of the ultrasonic wave from the detector 220 crosses a plane parallel to the X-direction and the Y-direction. For example, the ultrasonic wave is transmitted along a direction perpendicular to the X-direction and the Y-direction. The transmitting direction of the ultrasonic wave is parallel to the Z-direction in the state in which the first stage 211 and the second stage 212 are not tilted.

For example, the first stage 211 includes a base 211a and a rotating part 211b. The base 211a is fixed with respect to the distal part of the arm mechanism 100. The base 211a is parallel to the X-direction and includes a curved surface having an arc-like shape around a rotation center C1. The rotating part 211b rotates around the X-direction along the curved surface of the base 211a.

The rotating part 211b of the first stage 211 is rotated by the first driver 241. The first driver 241 includes a motor; and electrical power is supplied via a wiring part 241a. When the first driver 241 operates, a driving force is transmitted to the first stage 211 via a transmission part 241b. The angle around the X-direction of the detector 220 is changed by the first stage 211 rotating around the X-direction.

For example, the second stage 212 includes a base 212a and a rotating part 212b. The base 212a is fixed with respect to the rotating part 211b. The base 212a is parallel to the Y-direction and includes a curved surface having an arc-like shape around a rotation center C2. The rotating part 212b rotates around the Y-direction along the curved surface of the base 212a.

The rotating part 212b of the second stage 212 is rotated by the second driver 242. The second driver 242 includes a motor; and electrical power is supplied via a wiring part 242a. When the second driver 242 operates, a driving force is transmitted to the second stage 212 via a transmission part 242b. The angle around the Y-direction of the detector 220 is changed by the second stage 212 rotating around the Y-direction.

The Z-direction lengths of the first and second drivers 241 and 242 are greater than the X-direction or Y-direction lengths. The rotation-axis directions of the motors of the first and second drivers 241 and 242 cross the X-direction and the Y-direction. For example, the rotation-axis directions of the motors are parallel to the Z-direction. The rotational directions of the motors are converted respectively into rotations around the X-direction and the Y-direction and transmitted to the first and second stages 211 and 212 by the transmission parts 241b and 242b.

The dispenser 230 dispenses a liquid or a gel. The dispensed liquid or gel is used as a couplant. The couplant is a medium used to acoustically match the ultrasonic wave between the detector 220 and the inspection object. The dispenser 230 dispenses the couplant along the Z-direction.

The dispenser 230 is mounted to the distal part of the arm mechanism 100 separately from the rotating stage 210. The posture of the dispenser 230 corresponds to the posture of the distal part of the arm mechanism 100. Or, the dispenser 230 may be mounted to the distal part of the arm mechanism 100 via the rotating stage 210. In such a case, the rotating stage 210 becomes larger. The necessary outputs of the first and second drivers 241 and 242 to rotate the rotating stage 210 also increase. To reduce the size of the end effector 200, it is favorable for the dispenser 230 to be mounted to the distal part of the arm mechanism 100 separately from the rotating stage 210.

The third driver 243 is mounted to the distal part of the arm mechanism 100 separately from the rotating stage 210. The third driver 243 moves the dispenser 230 in the Z-direction with respect to the distal part of the arm mechanism 100. For example, the third driver 243 includes an air cylinder. The third driver 243 may include an actuator.

The piston of the third driver 243 is located along the Z-direction. The piston slides in the Z-direction on a plate member 243a fixed to the outer tube 251 described below. When viewed along the Z-direction, the dispenser 230 and the third driver 243 are positioned at opposite sides with the outer tube 251 interposed. A link part 243b is linked to the piston of the third driver 243. A link part 243c is linked to the link part 243b. The dispenser 230 is fixed with respect to the link part 243c. The link part 243b is a bent plate-shaped member and is configured in a shape that can avoid interference of other members when sliding. The link part 243c is a concave member having a recess extending in the Z-direction. The upper portion of the dispenser 230 is fixed inside the recess of the link part 243c. The dispenser 230 and the third driver 243 that are positioned at opposite sides with the outer tube 251 interposed are linked by the link part 243b. When the third driver 243 slides in the Z-direction, the dispenser 230 moves in the Z-direction via the link parts 243b and 243c. The third driver 243 also includes a speed controller 243d. The speed controller 243d controls the flow rate of gas flowing through the cylinder.

The rotating stage 210, the dispenser 230, the first to third drivers 241 to 243, etc., are mounted to the distal part of the arm mechanism 100 via the outer tube 251. The outer tube 251 is a hollow tubular member extending in the Z-direction and is fixed with respect to the distal part of the arm mechanism 100. The rotary joint 252 is located inside the outer tube 251. The rotary joint 252 is rotatable around the Z-direction with respect to the outer tube 251.

Wiring for supplying electrical power to the rotating stage 210, the detector 220, the dispenser 230, and the like, the pipe (a second pipe) for supplying the couplant to the dispenser 230, etc., are passed through the interior of the outer tube 251. The pipe through which the couplant passes is connected via the rotary joint 252 to the pipe (a first pipe) bound by the binding member 140. In other words, the pipe that is mounted to the end effector 200 is rotatable with respect to the pipe mounted to the arm mechanism 100. For example, when the outer tube 251 is rotated around the Z-direction by the rotation axis 120, the pipe that is mounted to the arm mechanism 100 is substantially not rotated by the rotary joint 252. Furthermore, the wiring that is mounted to the end effector 200 may be connected via the rotary joint 252 to the wiring that is mounted to the arm mechanism 100.

The wiring for supplying the electrical power to the rotating stage 210 located inside the outer tube 251 is connected with the wiring parts 241a and 242a via not-illustrated wiring. The pipe of the couplant located inside the outer tube 251 is connected with the dispenser 230 via a coupling 231, a not-illustrated pipe, and a coupling 232. The pipe of gas located inside the outer tube 251 is connected with the speed controller 243d via a not-illustrated pipe.

The sensor 260 directly or indirectly detects the contact of the detector 220 with the inspection object. The sensor 260 is, for example, a force sensor, an acceleration sensor, an angular velocity sensor, a photointerrupter sensor, or a distance sensor.

The control device 300 controls the components of the end effector 200. For example, the control device 300 transmits drive signals to the first and second drivers 241 and 242. The first driver 241 and the second driver 242 are driven according to the drive signals. The control device 300 is connected with the arm mechanism 100 and the end effector 200 by wired communication, wireless communication, or a network. The arm mechanism 100 and the end effector 200 may be controlled by one control device 300. Or, the arm mechanism 100 and the end effector 200 may be controlled by multiple control devices 300. For example, the motor of the rotation axis 120, the first driver 241, and the second driver 242 are controlled by one control device 300. The dispenser 230 is controlled by another control device 300. The processing device 400 is connected with the detector 220 by wired communication, wireless communication, or a network. The processing of the detection result of the detector 220, the calculation of the tilt, the inspection, etc., may be performed by multiple processing devices 400. A portion of the processing may be performed by a special-purpose processing device 400; and the other portion of the processing may be performed by another general-purpose processing device 400.

Figure 4:
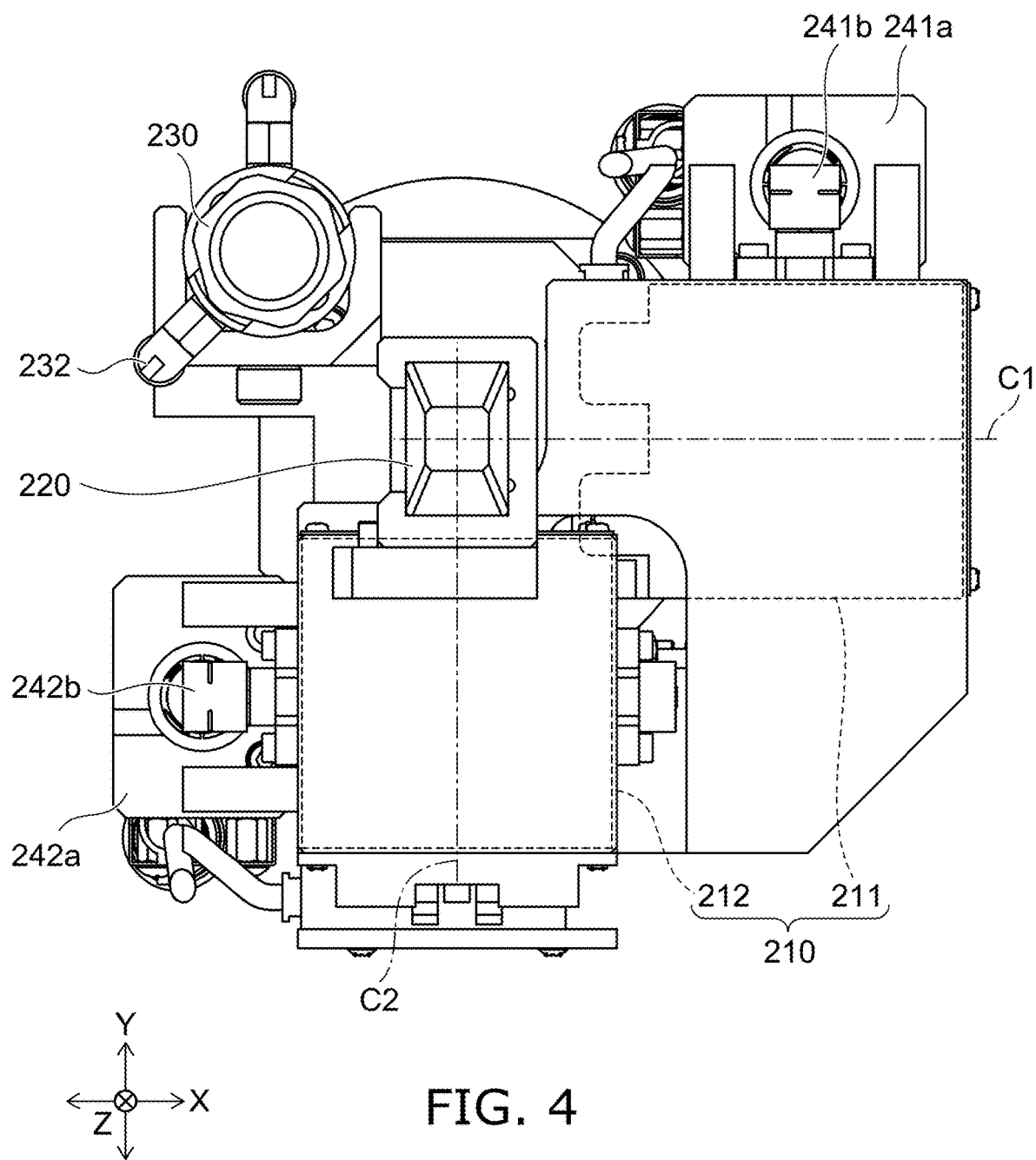
FIG. 4 is a plan view illustrating the end effector according to the embodiment.

FIG. 4 is a plan view illustrating the end effector according to the embodiment.

FIG. 4 illustrates the end effector 200 when viewed along the Z-direction. In FIG. 4, the first stage 211 and the second stage 212 are illustrated by broken lines.

As illustrated in FIGS. 2 to 4, the tip of the detector 220 is positioned at the rotation center C1 of the first stage 211. As illustrated in FIG. 4, the Y-direction position of the rotation center C1 of the first stage 211 is the same as the Y-direction position of the tip of the detector 220. When the first stage 211 rotates, the tip of the detector 220 rotates on the rotation center C1. The change of the Y-direction position of the tip of the detector 220 when the first stage 211 rotates can be suppressed thereby. For example, only the tilt around the X-direction of the tip of the detector 220 is changed without changing the Y-direction position of the tip of the detector 220.

The tip of the detector 220 is positioned at the rotation center C2 of the second stage 212. The X-direction position of the rotation center C2 of the second stage 212 is the same as the X-direction position of the tip of the detector 220. When the second stage 212 rotates, the tip of the detector 220 rotates on the rotation center C2. The change of the X-direction position of the tip of the detector 220 when the second stage 212 rotates can be suppressed thereby. For example, only the tilt around the Y-direction of the tip of the detector 220 is changed without changing the X-direction position of the tip of the detector 220.

The processing device 400 receives the detection result of the reflected wave of the ultrasonic wave from the detector 220. The processing device 400 calculates the tilt of the detector 220 with respect to the object based on the detection result. The control device 300 rotates the rotating stage 210 based on the calculated tilt. In other words, feedback control of the tilt of the detector 220 is performed based on the detection result of the reflected wave. When the calculated tilt is within a preset tolerance range (a first range), the processing device 400 inspects the object based on the detection result.

Figure 5:
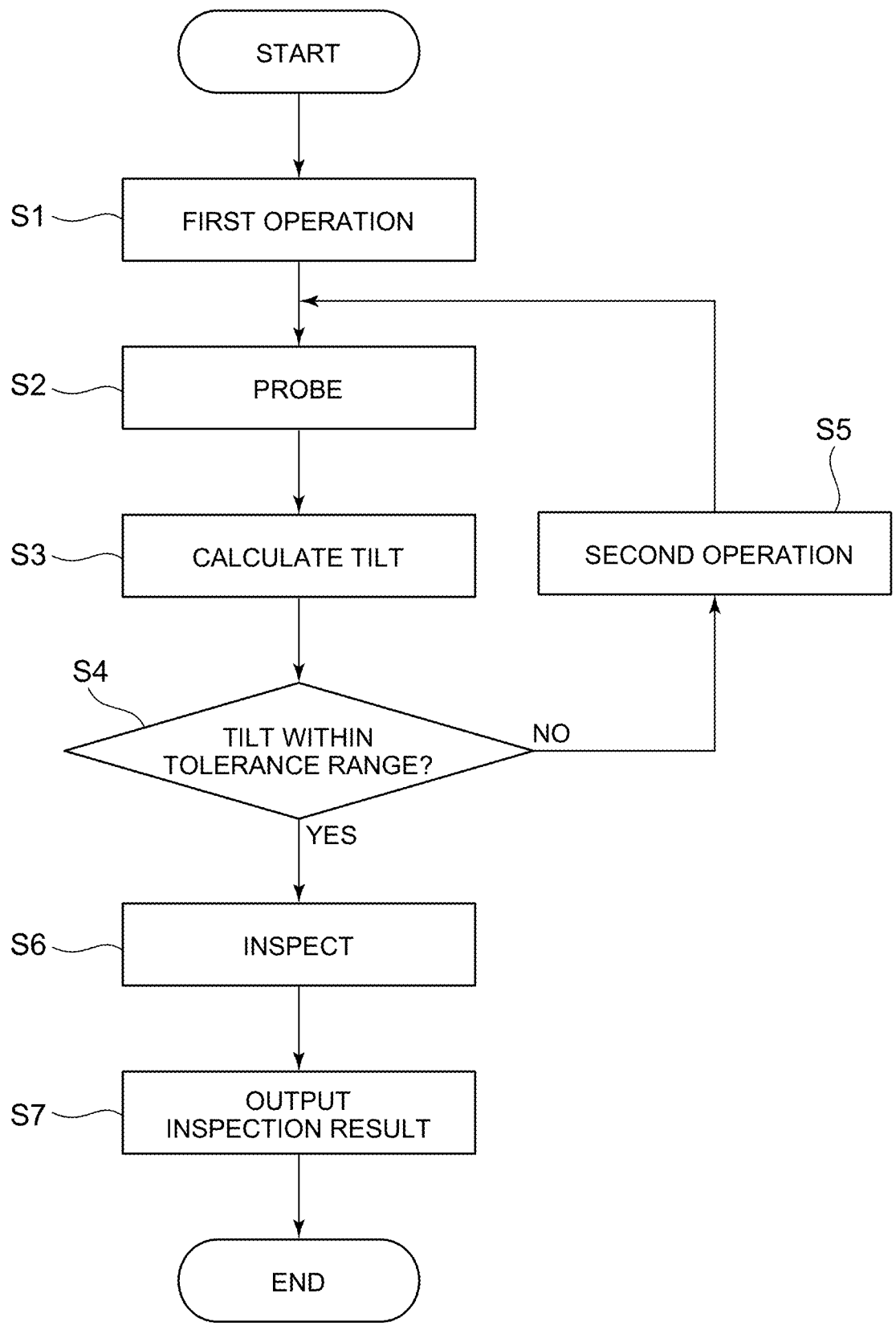
FIG. 5 is a flowchart illustrating operations of a detection system according to the embodiment.

FIG. 5 is a flowchart illustrating operations of a detection system according to the embodiment.

The control device 300 performs a first operation (step S1). In the first operation, the control device 300 moves the detector 220 by operating the arm mechanism 100. For example, the control device 300 sets the posture of the distal part of the arm mechanism 100 to a pre-taught posture. The posture is set so that the tip of the detector 220 contacts the object.

For example, the sensor 260 is a photointerrupter sensor or a distance sensor. The detector 220 is movable a slight distance in the Z-direction with respect to the rotating stage 210. When the tip of the detector 220 contacts the object in the first operation, the detector 220 moves in the Z-direction with respect to the rotating stage 210 due to the reaction force on the detector 220 from the object. The sensor 260 detects the movement of the detector 220. The control device 300 determines that the tip of the detector 220 has contacted the object when the movement of the detector 220 is detected by the sensor 260. The control device 300 stops the arm mechanism 100.

The detector 220 probes when the detector 220 contacts the object (step S2). The detector 220 detects the reflected wave and transmits the detection result to the processing device 400. The processing device 400 calculates the tilt of the detector 220 with respect to the object (step S3). The processing device 400 determines whether or not the tilt is within a preset tolerance range (step S4).

When the tilt is not within the tolerance range, the processing device 400 transmits the calculated tilt to the control device 300. The control device 300 performs a second operation (step S5). In the second operation, the control device 300 changes the tilt of the tip of the detector 220 by operating the rotating stage 210. The difference between the tilt and the tolerance range is reduced thereby. Subsequently, the probe is re-performed. When the tilt is within the tolerance range, the processing device 400 inspects the object based on the detection result (step S6). The processing device 400 outputs the inspection result (step S7).

Figure 6:
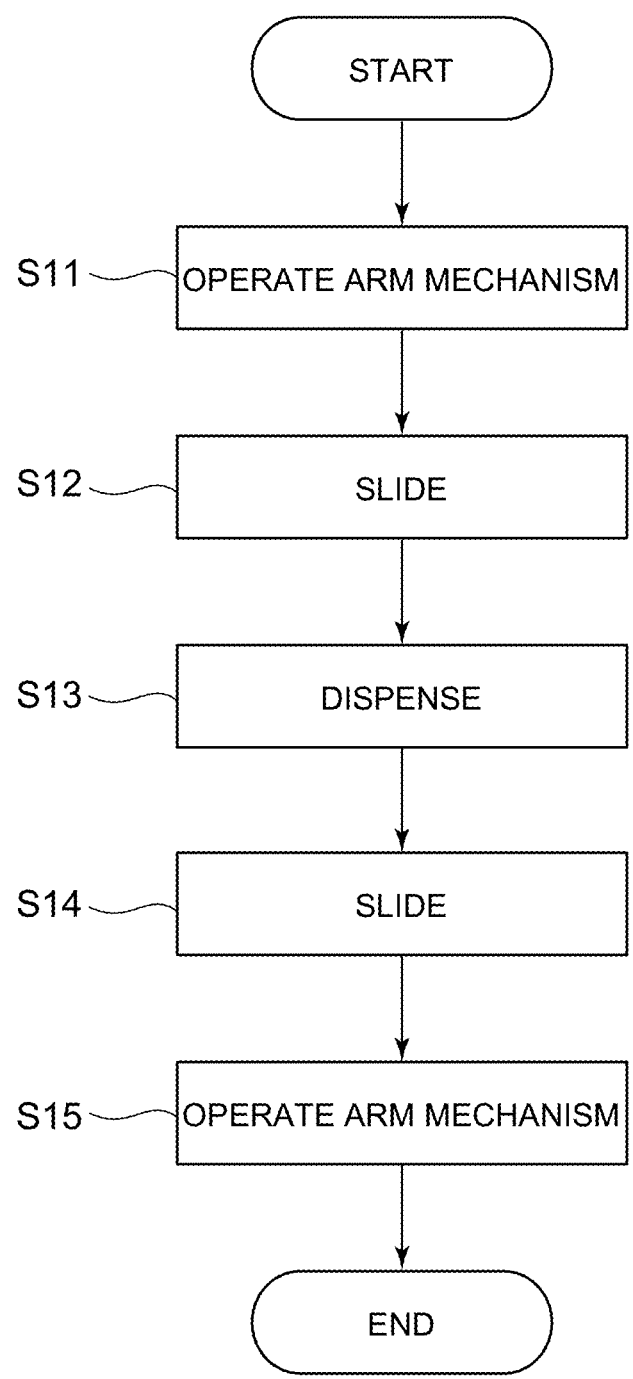
FIG. 6 is a flowchart illustrating details of the first operation.

FIG. 6 is a flowchart illustrating details of the first operation.

The first operation includes, for example, the following operations. The control device 300 operates the arm mechanism 100 (step S11) and thereby positions the dispenser 230 at a position for dispensing the couplant on the object. The control device 300 causes the third driver 243 to slide along the Z-direction so that the dispenser 230 approaches the object (step S12). The dispenser 230 dispenses the couplant toward the object (step S13). The control device 300 causes the third driver 243 to slide along the Z-direction to separate the dispenser 230 from the object (step S14). The control device 300 operates the arm mechanism 100 (step S15). Thereby, the tip of the detector 220 contacts the object. The contact with the object is determined based on the detection result of the sensor 260. Subsequently, the probe is performed.

Effects of the embodiment will now be described.

The detection system 1 according to the embodiment includes the arm mechanism 100 and the end effector 200. The arm mechanism 100 is articulated and can easily adjust the posture of the end effector 200. The end effector 200 includes the detector 220. The detector 220 probes. A favorable range exists for the tilt of the detector 220 with respect to the object to be probed. By probing after setting the tilt of the detector 220 to be within the favorable range, the accuracy of the inspection using the detection result is increased.

On the other hand, control singularities of the articulated arm mechanism 100 exist. Control singularity refers to a posture (a position and an orientation) for which the rotation angles of the rotation axes 120 cannot be determined by an inverse kinematics calculation. The rotation angles of the rotation axes 120 cannot be uniquely determined at a singularity. Therefore, the posture of the arm mechanism 100 cannot be set to such a posture. The operation of the arm mechanism 100 may become unstable proximate to the singularity. Hereinbelow, the posture at the singularity and proximate to the singularity is collectively called the "singularity vicinity".

Figure 7A:
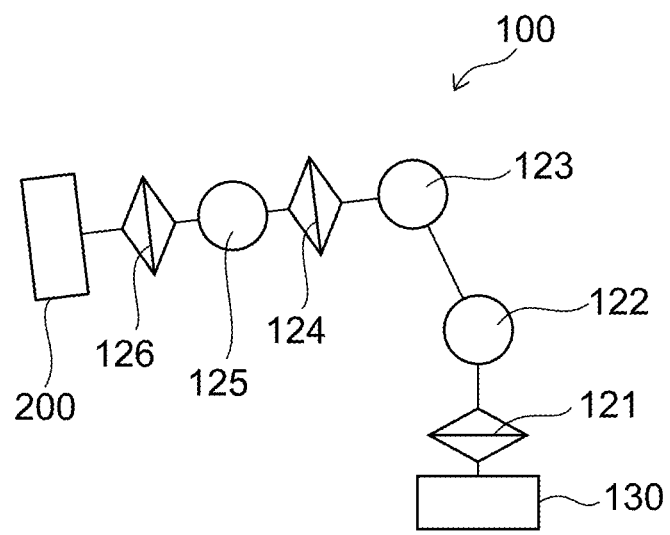
FIGS. 7A and 7B are schematic views for describing singularities.
Figure 7B:
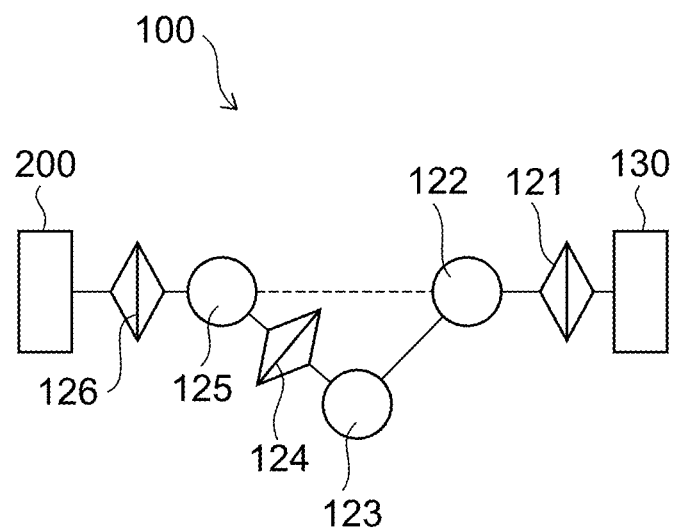

FIGS. 7A and 7B are schematic views for describing singularities.

FIG. 7A illustrates the state when the arm mechanism 100 is viewed laterally. FIG. 7B illustrates the state when the arm mechanism 100 is viewed from above. The multiple rotation axes 120 include rotation axes 121 to 126 from a base 130 toward the end effector 200. As illustrated in FIG. 7A, when the rotation center of the rotation axis 124 and the rotation center of the rotation axis 126 are arranged on the same straight line, the end effector 200 can be rotated by rotating either the rotation axis 124 or 126. When the rotation center of the rotation axis 121 and the rotation center of the rotation axis 126 are arranged on the same straight line as illustrated in FIG. 7B as well, the end effector 200 can be rotated by rotating either the rotation axis 124 or 126. For the postures illustrated in FIGS. 7A and 7B, the rotation angles of the rotation axes 121 to 126 are not uniquely determined by an inverse kinematics calculation. Therefore, there is a possibility that the arm mechanism 100 may be uncontrollable or the operation of the arm mechanism 100 may become unstable when the posture of the control point is at a singularity vicinity.

For example, an operation of the arm mechanism 100 such that the posture of the control point is not at a singularity vicinity can be taught when exactly the same movement of the arm mechanism 100 is repeated by the teaching playback method. However, when the posture of the control point is adjusted based on the calculation result of the tilt by the processing device 400, the control point may have a posture that is not taught. Therefore, there is a possibility that the posture of the control point may be at a singularity vicinity when adjusting the posture of the control point.

For this problem, in the detection system 1 according to the embodiment, the end effector 200 includes the rotating stage 210. The rotating stage 210 rotates the detector 220 with respect to the distal part of the arm mechanism 100. The tip of the detector 220 is positioned at the rotation center of the rotating stage 210. Therefore, the rotating stage 210 can change the tilt of the detector 220 while suppressing the change of the position of the tip of the detector 220. By using the rotating stage 210, the posture of the control point of the arm mechanism 100 can be prevented from having a posture other than a pre-taught posture. Therefore, the likelihood of the posture of the control point being at a singularity vicinity can be reduced, and the occurrence of unstable operations can be suppressed. According to the embodiment, a detection system is provided in which the operations are more stable and the ease of use is good.

Compared to the arm mechanism 100, the rotating stage 210 is easier to control and has fewer machine elements. By using the rotating stage 210 to adjust the tilt of the tip of the detector 220, the tilt can be adjusted with higher accuracy than when the arm mechanism 100 is used. Compared to when a unit having three or more degrees of freedom is used, the rotating stage 210 easily produces a large output. Therefore, a larger size of the end effector 200 can be suppressed by using the rotating stage 210. For example, the interference of the end effector 200 with other members when the detector 220 contacts the object can be suppressed.

The end effector 200 includes the first driver 241 and the second driver 242 respectively to drive the first and second stages 211 and 212 of the rotating stage 210. The rotational directions of the motors of the first and second drivers 241 and 242 are converted around the X-direction and the Y-direction and transmitted to the first and second stages 211 and 212 by the transmission parts 241b and 242b. According to this configuration, the size of the end effector 200 in the X-direction and the Y-direction can be less than when the rotation-axis directions of the motors are parallel to the X-Y plane. For example, the end effector 200 does not easily contact other members even when the object location of the inspection is at an inaccessible position. The ease of use of the end effector 200 can be improved.

As illustrated in FIG. 4, the first stage 211 and the second stage 212 do not overlap the tip of the detector 220 when viewed along the Z-direction. In other words, the X-direction position of the first stage 211 is different from the X-direction position of the tip of the detector 220. The Y-direction position of the second stage 212 is different from the Y-direction position of the tip of the detector 220. According to this configuration, interference of the wiring of the detector 220 with the first and second stages 211 and 212 can be suppressed when the wiring is drawn out toward the distal part of the arm mechanism 100. For example, it is unnecessary to route the wiring with a long wiring length to avoid interference with the first and second stages 211 and 212. The interference of the wiring with the other members when operating the arm mechanism 100 and the end effector 200 can be suppressed.

As illustrated in FIG. 4, a portion of the first stage 211 overlaps a portion of the second stage 212 when viewed along the Z-direction. For example, a portion of the rotating part 211b of the first stage 211 overlaps the base 212a and the rotating part 212b of the second stage 212. According to this configuration, compared to when the first stage 211 and the second stage 212 do not overlap, the size of the end effector 200 in the X-direction and the Y-direction can be reduced. For example, the ease of use of the end effector 200 can be improved.

When the change amount of the tilt when adjusting the tilt of the detector 220 with respect to the object is greater than the rotatable range of the rotating stage 210, the tilt of the detector 220 may be adjusted by the arm mechanism 100. For example, the probe is performed again by the detector 220 after the tilt of the detector 220 is adjusted by the arm mechanism 100. Subsequently, the tilt of the detector 220 is adjusted by the rotating stage 210. In such a case as well, by using the rotating stage 210 to adjust the tilt, the change amount of the tilt by the arm mechanism 100 can be reduced, and the posture of the control point can be prevented from being at a singularity vicinity.

The detection system 1 is widely applicable to non-destructive inspection using an ultrasonic wave. By using the detection system 1 in an inspection, the tilt of the detector 220 can be automatically adjusted. Thereby, the accuracy of the inspection can be increased compared to when a human probes by holding the detector 220. Also, the reliability of the inspection result can be increased because the inspection result is independent of human experience, sensory perception, etc.

For example, the detection system 1 is applied to the inspection of a joined body that is welded. Here, the inspection of a joined body in which multiple members are joined by resistance spot welding will be described. In resistance spot welding, multiple members are joined in a spot configuration. A weld portion is formed by portions of the multiple members melting and mixing with each other, followed by solidification. For example, the inspection verifies whether or not the diameter of the weld portion is sufficiently large.

It is favorable to use a couplant when probing with the detector 220. By using a couplant, the ultrasonic wave easily propagates between the detector 220 and the object. It is favorable to provide the rotary joint 252 to supply the couplant to the dispenser 230. Specifically, the first pipe for supplying the couplant is located in the arm mechanism 100. For example, the first pipe is located inside the binding member 140. The second pipe is located at the end effector 200. One end of the second pipe is connected with the first pipe via the rotary joint 252. The other end of the second pipe is connected with the dispenser 230.

When dispensing the couplant, there are cases where the end effector 200 is rotated around the Z-direction to adjust the position of the dispenser 230. If the rotary joint 252 is not provided, twisting of the pipe for supplying the couplant occurs when rotating the end effector 200. The length of the pipe must have an ample margin for the twisting. When the rotary joint 252 is provided, the twisting of the pipe when rotating the end effector 200 can be suppressed. The length of the pipe can be reduced thereby, and the likelihood of the pipe interfering with other members can be reduced.

Similarly, it is favorable for the wiring other than the pipes to be provided through the rotary joint 252. The length of the wiring can be reduced thereby, and the likelihood of interference of the wiring with other members can be reduced.

Figure 8:
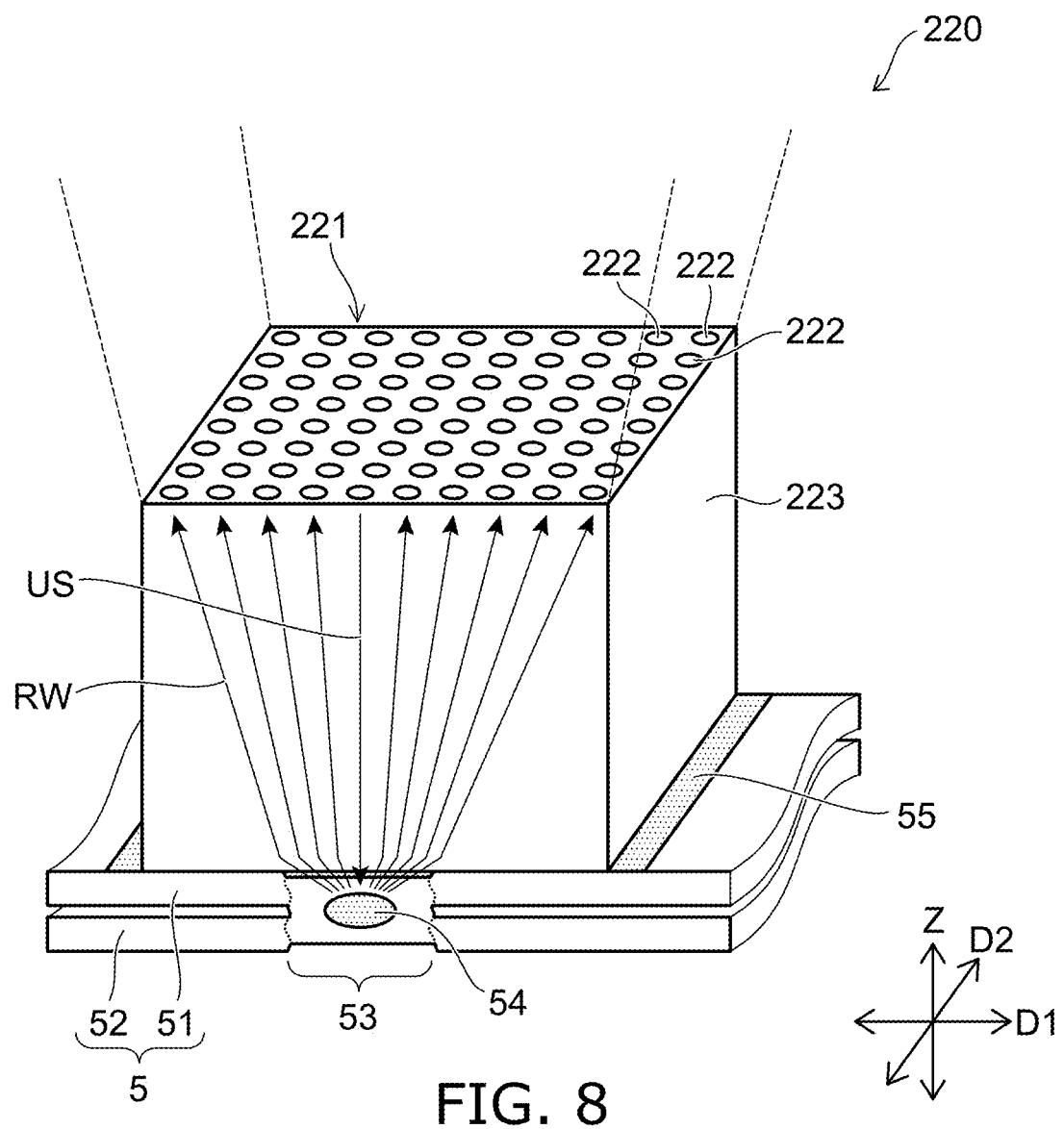
FIG. 8 is a perspective view illustrating the internal structure of the detector tip.

FIG. 8 is a perspective view illustrating the internal structure of the detector tip.

As illustrated in FIG. 8, an element array 221 is located inside the tip of the detector 220. The element array 221 includes multiple detection elements 222. The detection elements 222 are, for example, transducers. The multiple detection elements 222 are arranged along a first arrangement direction D1 and a second arrangement direction D2. The first arrangement direction D1 and the second arrangement direction D2 cross each other. In the illustrated example, the first arrangement direction D1 and the second arrangement direction D2 are orthogonal to each other.

A propagating part 223 also is located at the tip of the detector 220. The ultrasonic wave that is transmitted from the element array 221 propagates toward the object via the propagating part 223. Also, the reflected wave from the object propagates toward the element array 221 via the propagating part 223. The propagating part 223 includes a resin material or the like through which an ultrasonic wave easily propagates. By providing the propagating part 223 that corresponds to the surface configuration of the object, the ultrasonic wave easily propagates into the interior of the object. Deformation, damage, etc., of the detector 220 can be suppressed by the propagating part 223 when the detector 220 contacts the object. The propagating part 223 has a hardness sufficient to suppress the deformation, damage, etc., when contacting the object.

FIG. 8 illustrates a state of inspecting a joined body 5. The joined body 5 is made by spot-welding a metal plate 51 (a first member) and a metal plate 52 (a second member) at a weld portion 53. A solidified portion 54 is formed at the weld portion 53 by a portion of the metal plate 51 and a portion of the metal plate 52 melting, mixing, and solidifying. Each detection element 222 transmits an ultrasonic wave US toward the joined body 5 onto which a couplant 55 is coated, and receives a reflected wave RW from the joined body 5.

As a more specific example, one detection element 222 transmits the ultrasonic wave US toward the weld portion 53 as illustrated in FIG. 8. A portion of the ultrasonic wave US is reflected by the upper surface or lower surface of the joined body 5, etc. The multiple detection elements 222 each receive (detect) the reflected waves RW. The detection elements 222 sequentially transmit the ultrasonic wave US; and the reflected waves RW are received by the multiple detection elements 222. The detection result of the reflected waves indicating the state of the vicinity of the weld portion 53 is obtained thereby.

Based on the detection result, the processing device 400 calculates the tilt around the first arrangement direction D1 and the tilt around the second arrangement direction D2 of the detector 220 with respect to the object. A case will now be described where the first arrangement direction D1 and the second arrangement direction D2 are respectively parallel to the X-direction and the Y-direction.

Figure 9:
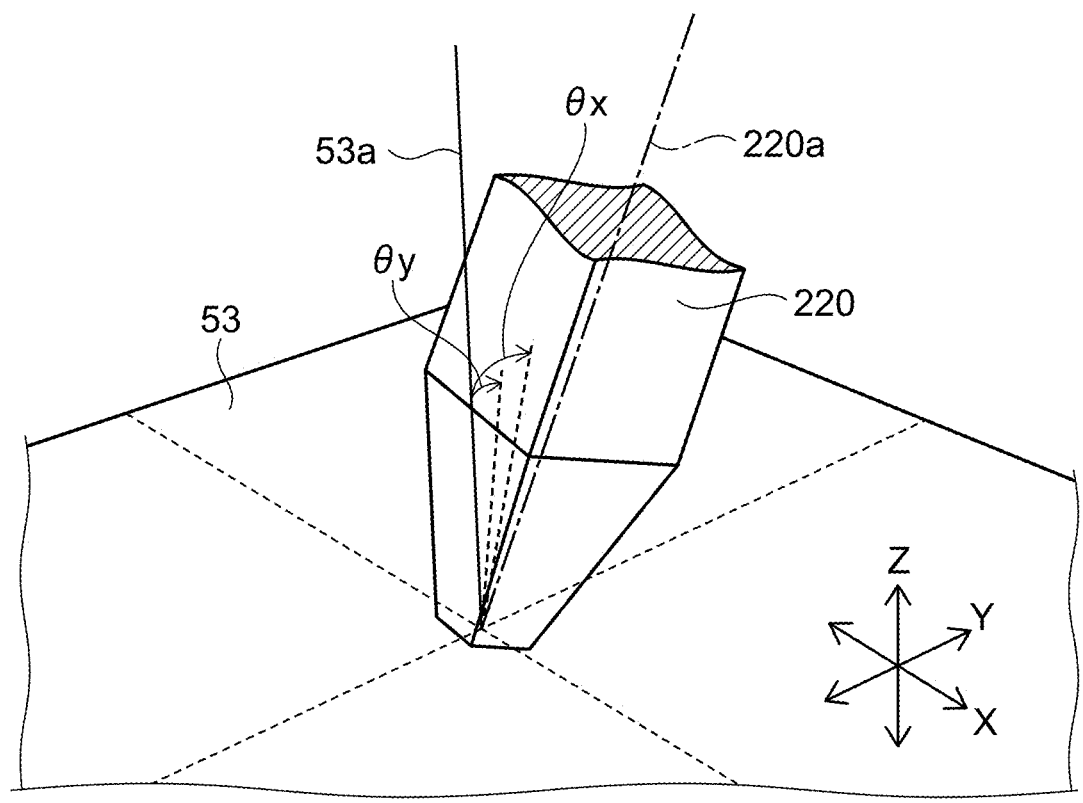
FIG. 9 is a figure for describing the calculation method of the tilt of the inspection.

FIG. 9 is a figure for describing the calculation method of the tilt of the inspection.

FIGS. 10 and 11A to 11C are examples of images obtained in the inspection.

Figure 10:
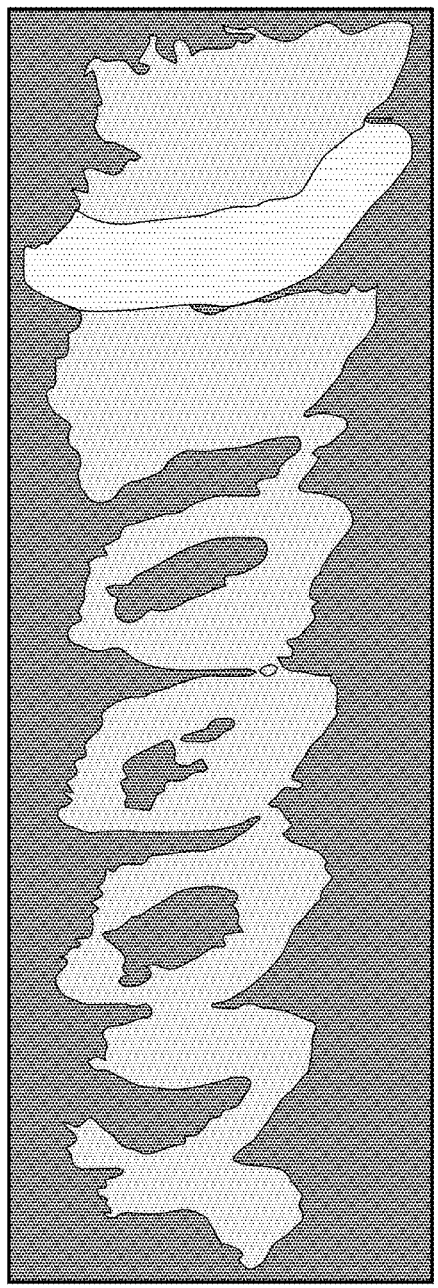
FIG. 10 is an example of an image obtained in the inspection.
Figure 10:
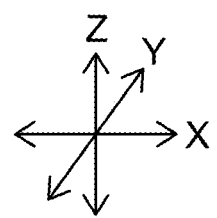
Figure 11A:
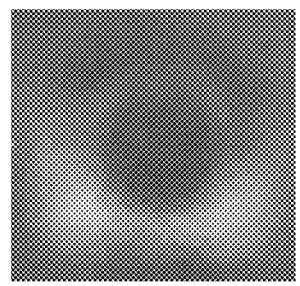
FIGS. 11A to 11C are examples of images obtained in the inspection.
Figure 11B:
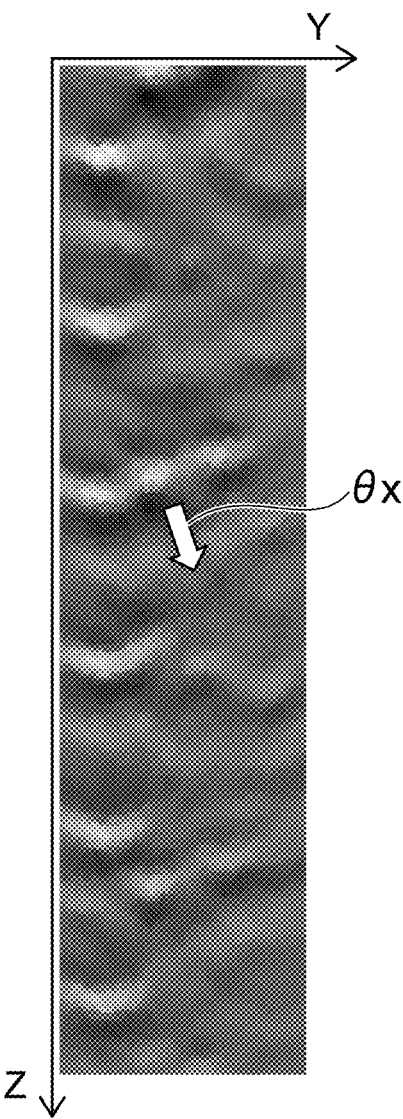
Figure 11C:
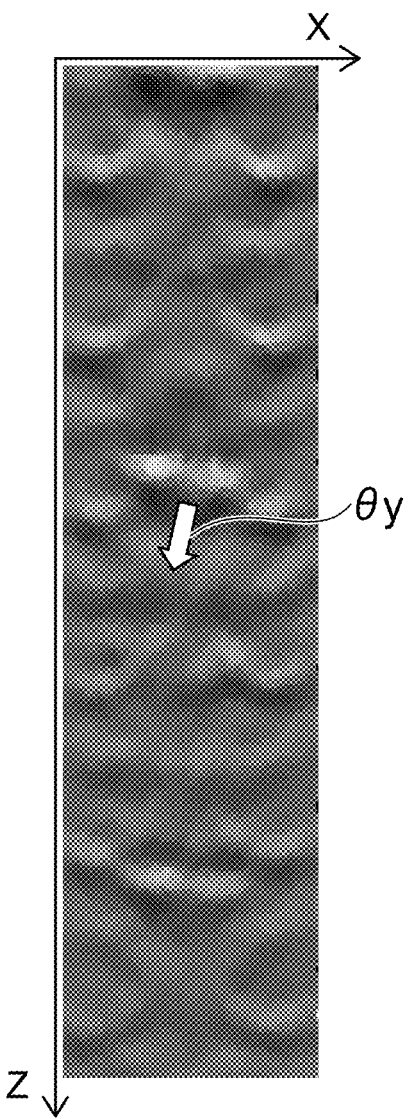

FIG. 10 is three-dimensional volume data depicted based on the detection result of the reflected waves. FIG. 11A illustrates the surface of the weld portion 53 in the volume data illustrated in FIG. 10. FIG. 11B illustrates the Y-Z cross section at the vicinity of the weld portion 53 in the volume data illustrated in FIG. 10. FIG. 11C illustrates the X-Z cross section at the vicinity of the weld portion 53 in the volume data illustrated in FIG. 10. In FIGS. 11B and 11C, the upper side is the surface of the weld portion 53; and the data downward in the depth direction is shown. The portions at which the luminance is high are portions at which the reflection intensity of the ultrasonic wave is large. The ultrasonic wave is intensely reflected by the bottom surface of the weld portion 53, a surface between the members not joined to each other, etc.

The tilt of the detector 220 corresponds to the angle between a direction 53a perpendicular to the weld portion 53 and a direction 220a of the detector 220 illustrated in FIG. 9. The direction 220a of the detector 220 is perpendicular to the arrangement direction of the detection element 222. This angle is represented as an angle around the first arrangement direction D1 and an angle around the second arrangement direction D2. When the first arrangement direction D1 and the second arrangement direction D2 are respectively parallel to the X-direction and the Y-direction, the angle between the directions 53a and 220a is represented as an angle θx around the X-direction and an angle θy around the Y-direction.

The angle θx is calculated based on the detection result in the Y-Z cross section as illustrated in FIG. 11B. The angle θy is calculated based on the detection result in the X-Z cross section as illustrated in FIG. 11C. The processing device 400 calculates the average of the three-dimensional luminance gradients in the cross sections as the angles θx and θy. The processing device 400 stores the calculated angles θx and θy in the memory device 410 as the tilt of the detector 220.

The accuracy of the inspection can be increased as the angle θx and the angle θy approach zero. The control device 300 operates the rotating stage 210 so that the calculated angle θx and angle θy approach zero. For example, the control device 300 reduces the angle θx by operating the first stage 211 to change the angle around the X-direction of the detector 220. The control device 300 reduces the angle θy by operating the second stage 212 to change the angle around the Y-direction of the detector 220.

It is favorable for the first and second arrangement directions D1 and D2 to be respectively parallel to the X-direction and the Y-direction. As described above, the tilt of the detector 220 with respect to the object is calculated as the angle around the first arrangement direction D1 and the angle around the second arrangement direction D2. When the first arrangement direction D1 and the second arrangement direction D2 are respectively tilted with respect to the X-direction and the Y-direction, it is necessary to calculate the angle around the X-direction and the angle around the Y-direction based on the calculated angles. When the first arrangement direction D1 and the second arrangement direction D2 are respectively parallel to the X-direction and the Y-direction, it is unnecessary to calculate the angle around the X-direction and the angle around the Y-direction. Also, the user can easily understand the tilt of the detector 220, the tilt of the rotating stage 210, etc., when the tilts are output toward the user.

FIGS. 12A to 12C are schematic views for describing an inspection method using the detector.

As illustrated in FIG. 12A, a portion of the ultrasonic wave US is reflected by an upper surface 5a of the metal plate 51 or an upper surface 5b of the weld portion 53. Another portion of the ultrasonic wave US enters the joined body 5 and is reflected by a lower surface 5c of the metal plate 51 or a lower surface 5d of the weld portion 53.

The Z-direction positions of the upper surface 5a, the upper surface 5b, the lower surface 5c, and the lower surface 5d are different from each other. In other words, the Z-direction distances between the detection element 222 and these surfaces are different from each other. The peaks of the intensities of the reflected waves are detected when the detection element 222 receives the reflected waves from these surfaces. Which surface reflected the ultrasonic wave US can be verified by calculating the time until each peak is detected after transmitting the ultrasonic wave US.

FIGS. 12B and 12C are graphs illustrating the relationship between the time after transmitting the ultrasonic wave US and the intensity of the reflected wave RW. Here, the intensity of the reflected wave RW is illustrated as an absolute value. The graph of FIG. 12B illustrates the reception result of the reflected wave RW from the upper surface 5a and the lower surface 5c of the metal plate 51. The graph of FIG. 12C illustrates the reception result of the reflected wave RW from the upper surface 5b and the lower surface 5d of the weld portion 53.

In the graphs of FIGS. 12B and 12C, a peak Pe10 is based on the reflected wave RW from the surface of the propagating part 223. A peak Pe11 is based on the reflected wave RW from the upper surface 5a. A peak Pe12 is based on the reflected wave RW from the lower surface 5c. The times from the transmission of the ultrasonic wave US until the peak Pe11 and the peak Pe12 are detected correspond respectively to the Z-direction positions of the upper surface 5a and the lower surface 5c of the metal plate 51.

Similarly, a peak Pe13 is based on the reflected wave RW from the upper surface 5b. A peak Pe14 is based on the reflected wave RW from the lower surface 5d. The times from the transmission of the ultrasonic wave US until the peak Pe13 and the peak Pe14 are detected correspond to the Z-direction positions of the upper surface 5b and the lower surface 5d of the weld portion 53.

The processing device 400 determines whether or not the peak Pe12 exists in the Z-direction reflected wave intensity distribution at multiple points in the X-Y plane. Specifically, the processing device 400 detects a peak in a prescribed range in the Z-direction in which the peak Pe12 may be detected. The processing device 400 compares the intensity of the peak with a prescribed threshold. When the peak is greater than the threshold, the processing device 400 determines that the peak is the peak Pe12. The existence of the peak Pe12 indicates that the lower surface 5c exists at that point, and that the metal plates 51 and 52 are not joined. The processing device 400 determines that the point at which the peak Pe12 is detected is not joined. The processing device 400 sequentially determines whether or not each of multiple points in the X-Y plane are joined. The set of points determined to be joined corresponds to the weld portion 53.

The intensity of the reflected wave may be represented in any form. For example, the reflected wave intensity that is output from the detection element 222 includes positive values and negative values according to the phase. Various processing may be performed based on the reflected wave intensity including the positive values and the negative values. The reflected wave intensity that includes the positive values and the negative values may be converted into an absolute value. The average value of the reflected wave intensities may be subtracted from the reflected wave intensity at each time. Or, the weighted average value, the weighted moving average value, or the like of the reflected wave intensities may be subtracted from the reflected wave intensity at each time. Various processing described in the application can be performed even when the results of such processing applied to the reflected wave intensity are used.

Modifications

Figure 13:
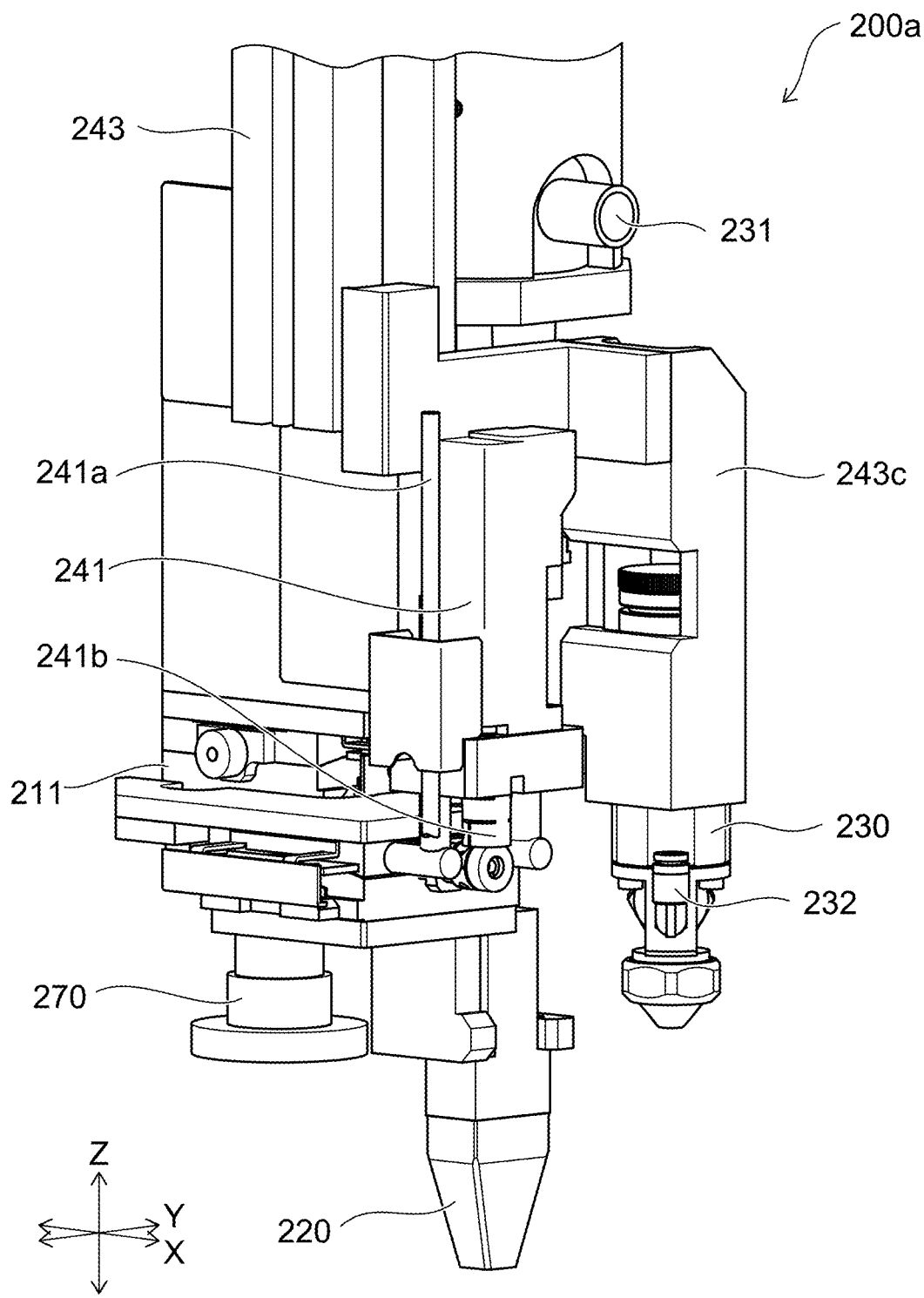
FIG. 13 is a perspective view illustrating an end effector according to a modification.

FIG. 13 is a perspective view illustrating an end effector according to a modification.

Compared to the end effector 200, an end effector 200a illustrated in FIG. 13 further includes an imaging device 270. The imaging device 270 images the object. Based on the image obtained by the imaging, the imaging device 270 or the processing device 400 determines the position to be inspected. Based on the determination result, the control device 300 moves the detector 220 and the dispenser 230 by operating the arm mechanism 100.

Figure 14:
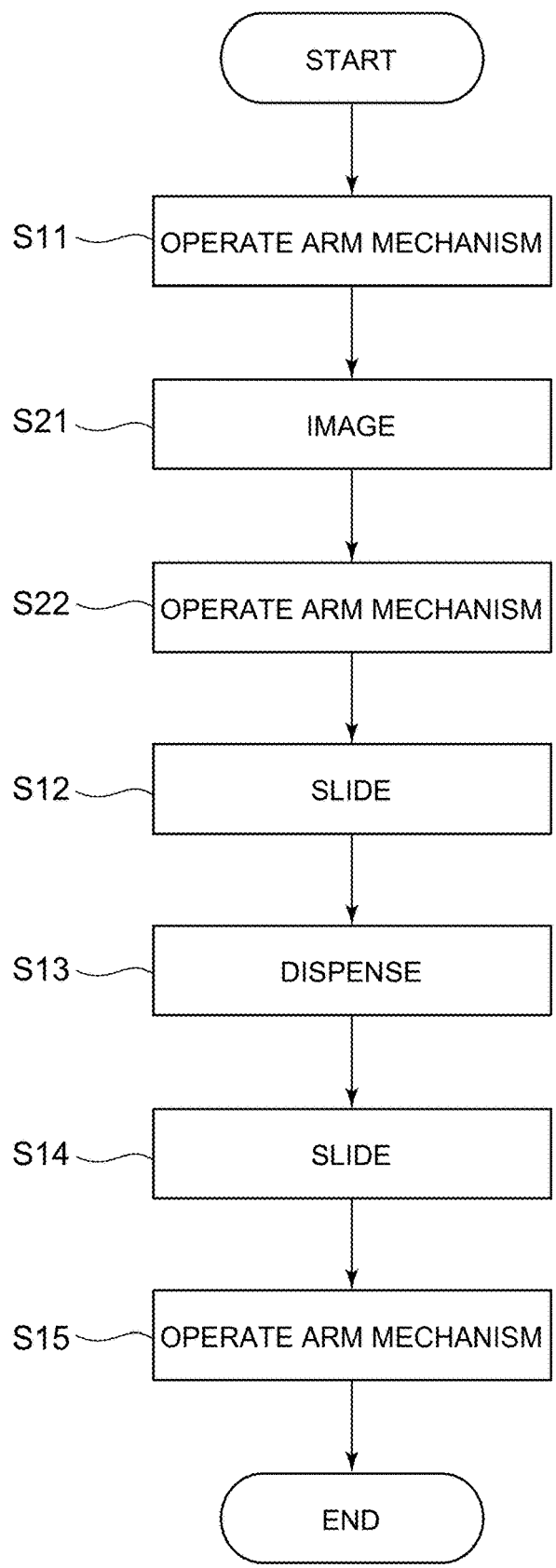
FIG. 14 is a flowchart illustrating details of the first operation using the end effector according to the modification.

FIG. 14 is a flowchart illustrating details of the first operation using the end effector according to the modification.

Compared to the flowchart illustrated in FIG. 6, the flowchart illustrated in FIG. 14 further includes steps S21 and S22. In step S21, the imaging device 270 images the object. In step S22, the control device 300 operates the arm mechanism 100 to correct the misalignment calculated based on the image.

According to the end effector 200a according to the modification, the misalignment can be corrected by the imaging device 270 even when the position at which the object is to be inspected is shifted from the position pre-taught to the detection system 1. The accuracy of the inspection can be increased thereby.

Examples are described above in which the detection system 1 includes the vertical articulated arm mechanism 100 having six degrees of freedom. The arm mechanism 100 may have four degrees of freedom or five degrees of freedom. Or, a horizontal articulated arm mechanism 100 having four or more degrees of freedom may be provided. In each configuration, the likelihood of the control point being at a singularity vicinity can be reduced by using the rotating stage 210 to adjust the tilt of the detector 220.

Figure 15:
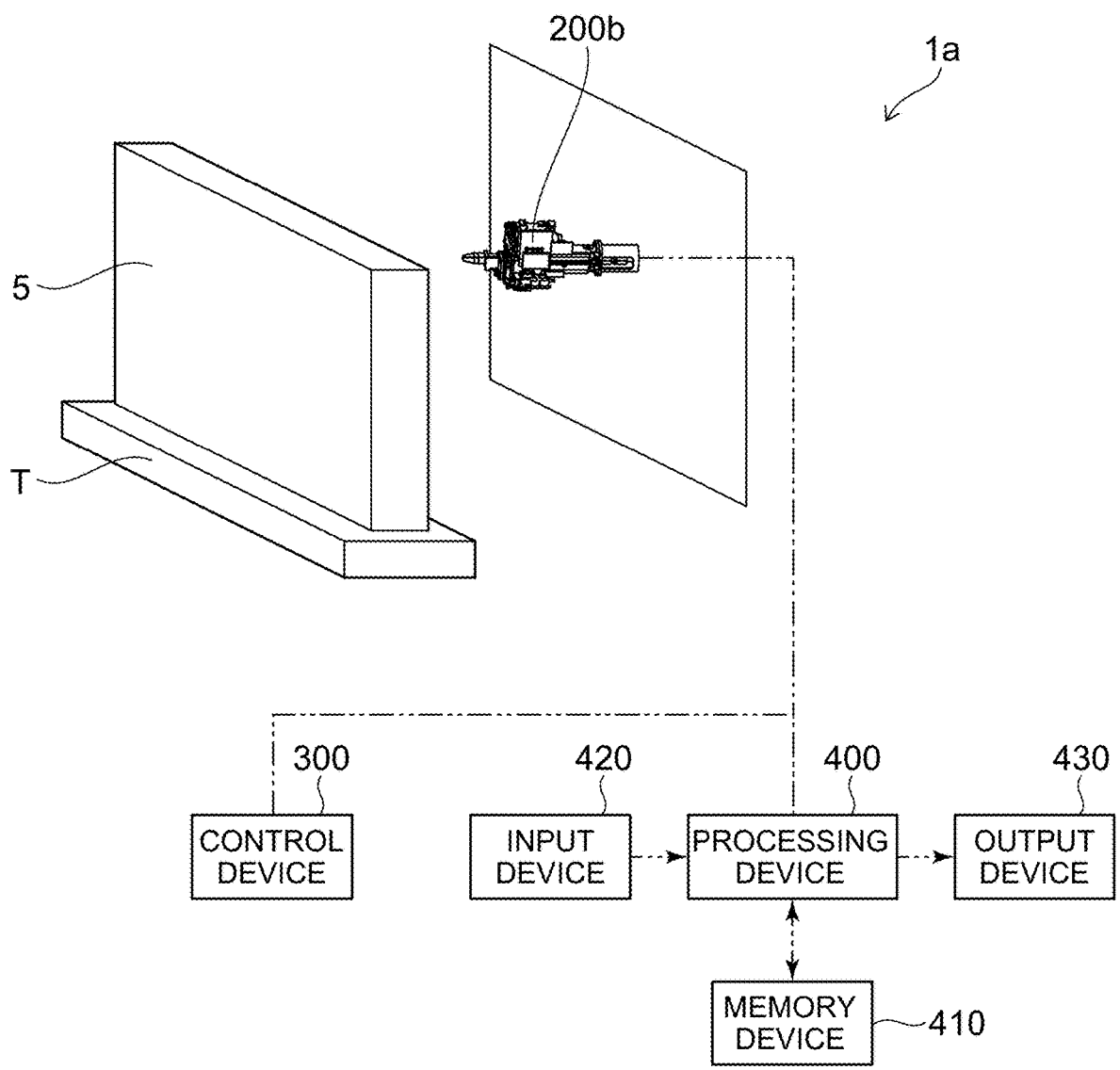
FIG. 15 is a schematic view illustrating a detection system according to a modification of the embodiment.

FIG. 15 is a schematic view illustrating a detection system according to a modification of the embodiment.

As illustrated in FIG. 15, the detection system 1a according to the modification does not include the arm mechanism 100. The detection system 1a includes a detection device 200b. The configuration of the detection device 200b is the same as the configuration of the end effector 200 or 200a.

The detection device 200b is mounted to any object. The detection device 200b can be mounted to another device, equipment, wall, etc. The orientation of the detection device 200b is arbitrary. The detection device 200b may be mounted so that the detector 220 faces the horizontal direction, or the detection device 200b may be mounted so that the detector 220 faces the vertical direction. The detector 220 is rotatable by the rotating stage 210 around the X-direction and the Y-direction with respect to the object to which the rotating stage 210 is mounted.

For example, a transfer device T transfers the joined body 5. The transfer device T transfers the joined body 5 to a position at which the detector 220 contacts the joined body 5. After the detector 220 contacts the joined body 5, steps S2 to S7 of the flowchart illustrated in FIG. 5 are performed.

The ease of use of the detection device 200b can be improved by applying the configuration of the end effector 200 or 200a described above to the configuration of the detection device 200b. In other words, the tip of the detector 220 is positioned at the rotation center of the rotating stage 210. Therefore, the rotating stage 210 can change the tilt of the detector 220 while suppressing the change of the position of the tip of the detector 220. Also, by using the rotating stage 210 to adjust the tilt of the detector 220, a large output is easily obtained compared to when a unit having three or more degrees of freedom is used. For example, the detection device 200b can be downsized, and interference of the detection device 200b with other members can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A detection system, comprising:

an arm mechanism that is articulated;

an end effector located at a distal part of the arm mechanism; and a control device controlling the arm mechanism and the rotating stage, the end effector including a rotating stage, and a detector located at the distal part with the rotating stage interposed, the detector transmitting an ultrasonic wave and detecting a reflected wave, a tip of the detector being positioned at a rotation center of the rotating stage, the control device performing a first operation of causing the detector to contact an object by operating the arm mechanism, and a second operation of changing a tilt of the tip of the detector by operating the rotating stage based on a detection result of the reflected wave from the detector.

2. The system according to claim 1, wherein the rotating stage is rotatable around a first direction and around a second direction perpendicular to the first direction, and the detector transmits the ultrasonic wave in a direction crossing a plane parallel to the first and second directions.

3. The system according to claim 2, wherein the rotating stage includes:

a first stage rotating around the first direction, and a second stage rotating around the second direction, a position in the first direction of the first stage is different from a position in the first direction of the tip of the detector, and a position in the second direction of the second stage is different from a position in the second direction of the tip of the detector.

4. The system according to claim 3, wherein at least a portion of the first stage does not overlap at least a portion of the second stage when viewed along a third direction perpendicular to the first and second directions.

5. The system according to claim 2, wherein
the detector includes a plurality of detection elements,
each of the plurality of detection elements transmits the ultrasonic wave and receives the reflected wave,
the plurality of detection elements is arranged along a first arrangement direction and a second arrangement direction,
the first arrangement direction and the second arrangement direction cross each other, and
the direction in which the ultrasonic wave is transmitted crosses a plane parallel to the first and second arrangement directions.

6. The system according to claim 5, wherein
the first arrangement direction is parallel to the first direction; and
the second arrangement direction is parallel to the second direction.

7. The system according to claim 1, wherein
the object is a weld portion of a joined body.

8. The system according to claim 1, further comprising:
a processing device calculating the tilt of the tip of the detector based on the detection result,
when the calculated tilt is not within a first range, the control device operates the rotating stage based on the calculated tilt,
the first range being preset.

9. The system according to claim 8, wherein
when the calculated tilt is within the first range, the processing device inspects the object based on the detection result of the reflected wave.

10. The system according to claim 1, wherein
the end effector includes a dispenser dispensing a liquid or a gel.

11. The system according to claim 10, wherein
the arm mechanism includes a first pipe supplying the liquid or the gel to the dispenser,
the end effector includes:
a rotary joint; and
a second pipe,
one end of the second pipe is connected to the first pipe via the rotary joint, and
another end of the second pipe is connected with the dispenser.

12. A control method of a system,
the system including:
an arm mechanism that is articulated; and
an end effector located at a distal part of the arm mechanism, the end effector including
a rotating stage, and
a detector located at the distal part with the rotating stage interposed, the detector transmitting an ultrasonic wave and detecting a reflected wave,
the method comprising:
changing a tilt of a tip of the detector by rotating the tip of the detector around a rotation center of the rotating stage by an operation of the rotating stage, the tilt of the detector being changed by operating the rotating stage based on a detection result of the reflected wave from the detector.

13. The method according to claim 12, wherein
the tilt of the detector is changed by rotating the rotating stage around a first direction and around a second direction perpendicular to the first direction, and
the ultrasonic wave is transmitted from the detector in a direction crossing a plane parallel to the first and second directions.

14. The method according to claim 12, wherein
when the calculated tilt is not within a first range, the rotating stage is operated based on the calculated tilt, and
the first range is preset.

15. The method according to claim 14, wherein
when the calculated tilt is within the first range, an object is inspected based on the detection result of the reflected wave.

16. An inspection method using a system, the system including:
an arm mechanism that is articulated; and
an end effector located at a distal part of the arm mechanism, the end effector including
a rotating stage, and
a detector located at the distal part with the rotating stage interposed, the detector transmitting an ultrasonic wave and detecting a reflected wave, a tip of the detector being positioned at a rotation center of the rotating stage,
the method comprising:
performing a first operation of causing the detector to contact an object by operating the arm mechanism;
performing a second operation of changing a tilt of the tip of the detector by operating the rotating stage based on a detection result of the reflected wave from the detector; and
inspecting the object based on the detection result of the reflected wave when the calculated tilt is within a first range, the first range is preset.

* * * * *